May 5, 1942.   H. KLAUCKE   2,281,938
RIGID-BACK CHAIN
Filed March 4, 1940   2 Sheets-Sheet 1

Hermann Klaucke
INVENTOR.

BY George A. Evans
ATTORNEY.

May 5, 1942.    H. KLAUCKE    2,281,938
RIGID-BACK CHAIN
Filed March 4, 1940    2 Sheets-Sheet 2
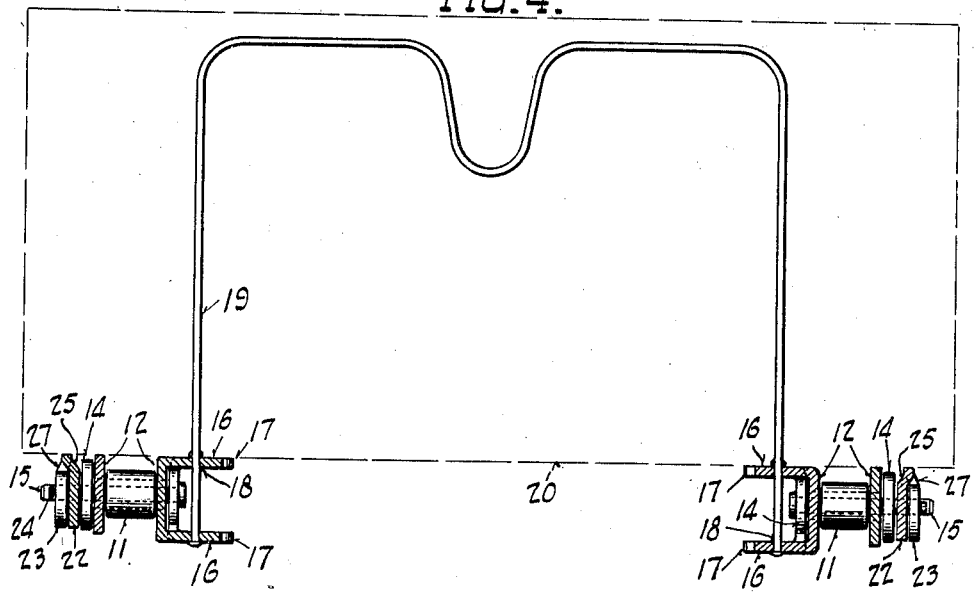
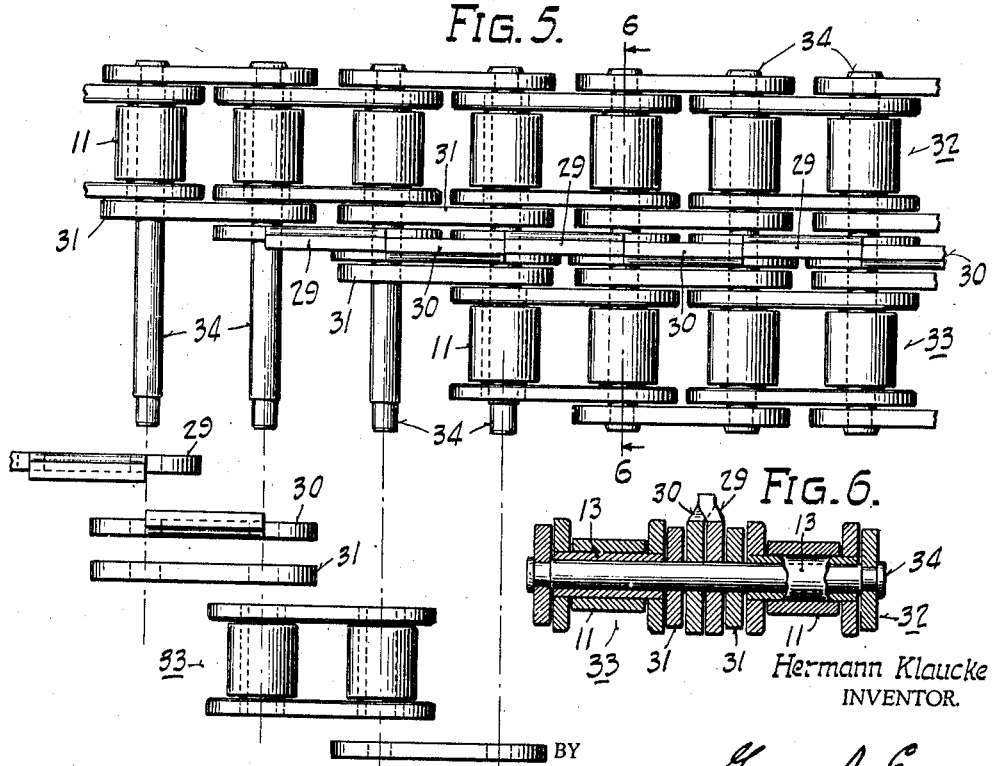
Hermann Klaucke
INVENTOR.
BY George A. Evans
ATTORNEY.

Patented May 5, 1942

2,281,938

UNITED STATES PATENT OFFICE 2,281,938

RIGID-BACK CHAIN

Hermann Klaucke, Worcester, Mass., assignor to Chain Belt Company, Milwaukee, Wis., a corporation of Wisconsin Application March 4, 1940, Serial No. 322,055

6 Claims. (Cl. 198—189)

This invention relates to sprocket chain which is used for power transmission and conveyor purposes and is characterized by the provision of means for limiting relative movement of individual chain links and in its preferred embodiment permits flexing in one direction only. This limitation, while enabling the chain to articulate around the sprockets, prevents it from sagging, as on the upper run, or flexing in the opposite direction, and thus eliminates back-lash. Furthermore by providing what is known as a rigid or stiff-back chain, conveyor units or flights assembled on the chain may be maintained in proper oriented position for various requirements.

It is an object of the present invention to provide a rigid-back chain which will be economical to manufacture and assemble, durable in service, and precise in operation. A further object of the invention is to provide a chain of the type mentioned which may be used with various attachments to produce improved results in certain classes of conveyors.

With the above objects in view, the invention resides in the novel construction, combination and arrangement of parts substantially as hereinafter described and more particularly defined in the appended claims.

Reference is made to the accompanying drawings in which like characters are used to designate like parts throughout and in which:

Figure 4 is a transverse sectional view of a conveyor utilizing the chain of this invention;

Figure 5 is a plan view of an assembly of several strands of transmission chain incorporating the stiff-back members herein disclosed; and Figure 6 is a transverse sectional view of the chain shown in Figure 5, taken on the line 6—6.

Figure 1:
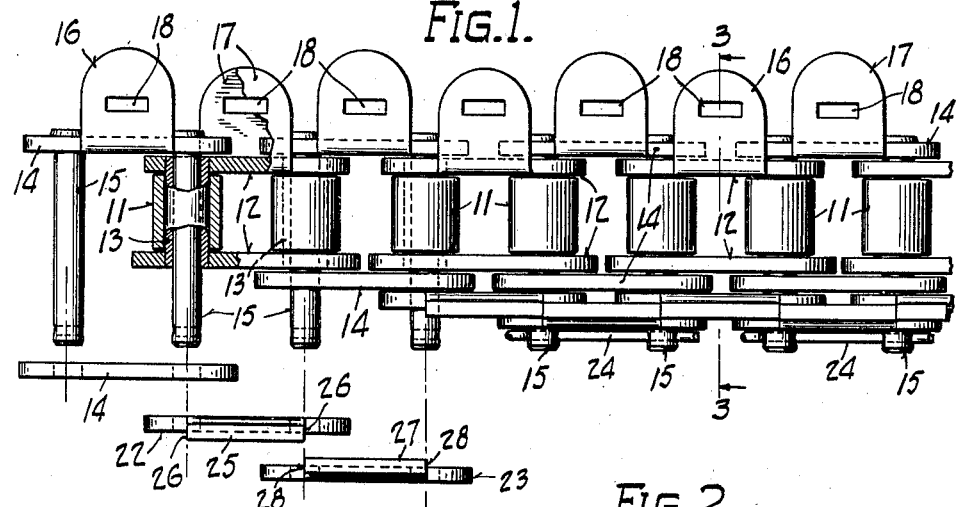
Figure 1 is a plan view of a plurality of chain links some partially assembled, said links carrying standard attachments.

The chain illustrated in the drawings is of the type generally classified as roller chain, inasmuch as there are rollers 11 mounted on the chain links for engagement with the sprockets. In such chain, there are two types of links, the roller links and the pin links, the former comprising inner side plates 12 and bushings 13 connecting the extremities of the side plates and supporting the rollers which are mounted thereon. The pin links comprise the outer side plates 14 and pins 15 connecting their extremities, said pins extending through the bushings 13 which act as bearings therefor. These two types of unit links are assembled in alternate relation in a strand of chain and each link is and acts as a separate unit.

Figure 2:
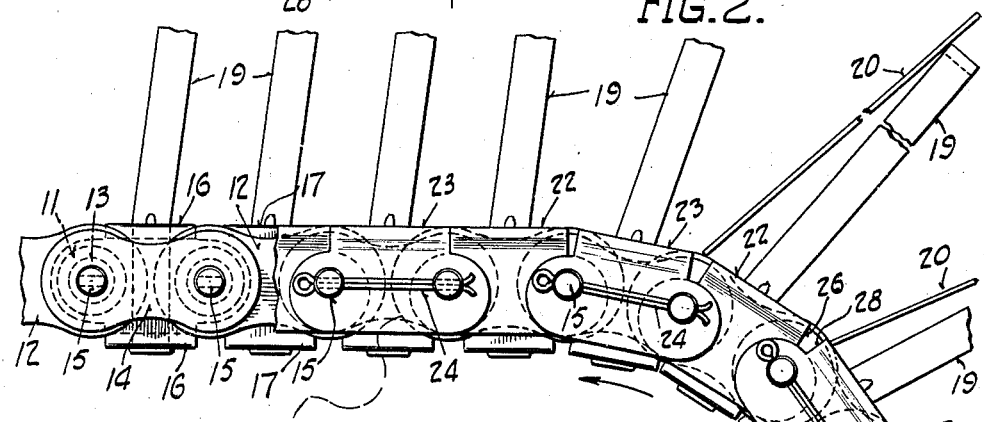
Figure 2 is a side elevation of the assembled links shown in Figure 1, with flights attached, parts being broken away.
Figure 3:
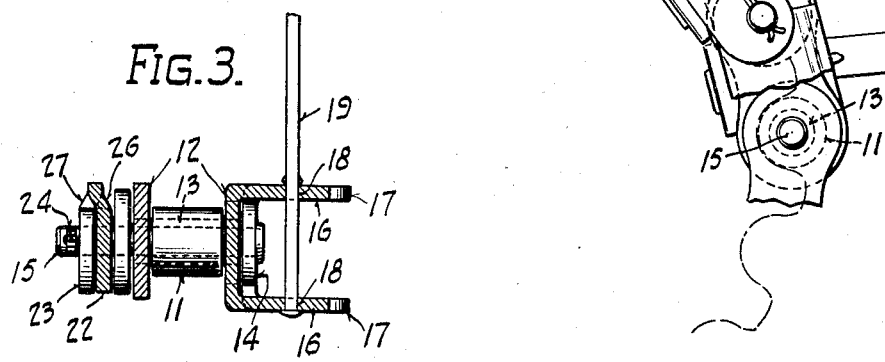
Figure 3 is a transverse sectional view of the chain taken on the line 3—3 of Figure 1.

In Figure 1, one line of side plates is flanged to provide attachments 16 and 17, lying in a plane at right angles to the surface of the side plates, these flanges being apertured as at 18 to accommodate flights 19 which extend from one strand of chain to another strand spaced therefrom and running parallel thereto as shown in Figure 4. In Figure 2, a portion of a conveyor chain is shown with flights 19 consisting of a U shaped wire arranged to incline backwardly a small angle from the vertical during the upper run of the chain and to accommodate thin, flat objects such as lithographic prints 20 during the drying thereof. Each sheet occupies a space between flights with the bottom edge resting on the chain, the sheets leaning back against the succeeding wire with the wet printing on the forward side of the sheets. Should the chain sag during the upper run, the forward flight might fall back against the succeeding sheet and mar the printing on the face contacted thereby.

The sheets are normally fed into the conveyor as the flights are spread into fan shape through articulation of the chain around the sprockets. When a flight has progressed slightly beyond a horizontal position, as shown in Figure 2, a sheet is placed on a flight with its printed side up. During movement of the chain around the sprocket into horizontal position, it is highly desirable to prevent any displacement of the sheets with respect to the conveyor, and particularly to prevent the bottom edges of the sheets from being pinched between chain links and torn or even thrown forward against the preceding flight. The chain hereinafter described not only prevents sagging on the upper run but also any displacement or pinching of sheets during the loading operation.

As shown in Figure 1, pins 15 are extended well beyond the line of side plates opposite the attachments in order to accommodate a pair of rigid-back members or supplemental side plates 22 and 23, in shape very similar to the side plates of the chain. Member 22 corresponds to the side plates of the roller link, having apertures providing a running fit for the extended pins. Member 23 is disposed outside member 22 and is preferably press fitted or otherwise securely attached to such pins in the manner of the side plates of the pin links. To render the links detachable, the pin ends are retained by replaceable cotters 24 extending across respective pins of each pin link.

The member 22 is formed with an offset portion 25, disposed outwardly with respect to the chain, said offset portion being arranged on the longitudinal edge of the member, which is the top surface during the upper run, and having end surfaces 26 radial of the center of the pins and at right angles to the direction of straight line chain movement. The amount of the offset is about equal to half the thickness of the side plate 22, this being sufficient so that an offset portion 27 formed inwardly on the corresponding upper edge of the other stiff-back member 23 may be aligned therewith. The portion 27 is also provided with flat, radial end surfaces 28 disposed to abut the end surfaces 26 on the first described offset member when the links are travelling in a straight line. This arrangement prevents flexing of the chain in more than one direction, and, in the class of conveyors shown in Figure 2, it prevents the chain from sagging during its upper run thus supporting the wires 19 in parallel, spaced relation.

The outer plate of the roller link is provided with rounded end portions, known as heads, formed on a radius from the center of the pin holes. The offset portions 26 and 27 are arranged so the top surfaces of these portions are not higher than and are preferably tangent to the curvature of the head of the corresponding links. Accordingly, should a sheet 20 be fed into the conveyor in such a manner that the bottom edge rested on the head of either of the side plates as shown in Figure 2, it would not be pinched between the ends of portions 26 and 27 as they come together, but would rest on the head portion until the stiff-back members had come into position to support it. Thereafter the sheet would rest on the flat surface provided by the top of the stiff-back members during the straight line portion of the conveyor's movement and until the sheets are dried and removed at the opposite end of the conveyor. Finally, by forming the top of attachments 16 and 17 at the same level with the top of the offset members, no displacement of the sheets can occur as between these elements.

In Figures 5 and 6, the present invention is illustrated with multiple-strands of chain in which stiff-back members 29 and 30 are interposed between the side plates 31 of a pair of chain strands 32 and 33, and pins 34 are extended through the complete assembly. As in the arrangement just described, one stiff-back member is preferably apertured to have a drive fit on the pins whereas the other member has a running fit, these members having the same respective positions as the corresponding side plates of the chain. In assembly, one strand of chain 32 is first mounted on the pins; the rigid-back member 29, which has a running fit on the pins, is next assembled in corresponding position to the roller links; then the other stiff-back link 30 is pressed on to those pins comprising the pin link; and finally the second strand of chain 33 is mounted laterally of the elements previously assembled. By disposing the stiff-back members between chain strands, the load is evenly balanced and there is no distortion of the moving chain.

The invention having been described, what is claimed is:

1. In a sprocket chain comprising links having side plates with rounded head sections and connecting pins, adjacent links providing carrying surfaces substantially tangent to the head sections of the side plate of an adjacent link, said carrying surfaces being disposed to abut and limit chain flexing.

2. In sprocket chain comprising links having side plates with rounded head sections and connecting pins, adjacent links having offset portions arranged to abut and limit flexing of the chain, said offset portions providing surfaces substantially tangent to the head sections of adjacent chain side plates.

3. The combination with a strand of chain and extended pins, of side plates having a running fit on said pins, and second side plates rigidly secured to pins connected by said chain strand, said side-plates having offset portions arranged to abut each other and limit flexing of the chain.

4. In combination with a plurality of chain strands having attachments and flights interposed therebetween, rigid-back members associated with each chain strand, said members being mounted as links upon the chain pins and having offset portions arranged to abut and limit flexing of the chain in one direction only, the side plates of said chain links having curved head sections, and the longitudinal surfaces of said offset portions being at all times tangent to said curved portion of corresponding side plates.

5. In combination with a plurality of chain strands having attachments and flights interposed therebetween, rigid-back members associated with each chain strand, said members being mounted as links upon the chain pins and having offset portions arranged to abut and limit flexing of the chain links, said offset portions providing a continuous, flat, upper surface during linear chain movement.

6. A stiff-back attachment for chain strands which comprises overlapping side plates, each plate having an offset portion arranged along one longitudinal edge thereof, said offset portions on adjacent plates being disposed in opposite directions in order that they may be aligned, and having end edges extending radially of the chain pins and at right angles to the direction of linear chain movement to prevent flexing of the chain in more than one direction, said offset portions providing flat, longitudinal surfaces arranged tangentially of the head section of corresponding chain side plates.

HERMANN KLAUCKE.